SATURABLE AMPLIFIER CONTROL AND SENSING COMBINATIONS

Filed Aug. 23, 1956 3 Sheets-Sheet 1

Inventor:
Burnette P. Chausse,
by Raymond A. Miles
His Attorney.

March 21, 1961 B. P. CHAUSSE 2,976,479

SATURABLE AMPLIFIER CONTROL AND SENSING COMBINATIONS

Filed Aug. 23, 1956 3 Sheets-Sheet 2

Inventor:
Burnette P. Chausse,
by Raymond A. Miles
His Attorney.

March 21, 1961 B. P. CHAUSSE 2,976,479

SATURABLE AMPLIFIER CONTROL AND SENSING COMBINATIONS

Filed Aug. 23, 1956 3 Sheets-Sheet 3

Inventor:
Burnette P. Chausse,
by Irving H. Marshman
His Attorney.

United States Patent Office 2,976,479

Patented Mar. 21, 1961

2,976,479

SATURABLE AMPLIFIER CONTROL AND SENSING COMBINATIONS

Burnette P. Chausse, Roanoke, Va., assignor to General Electric Company, a corporation of New York Filed Aug. 23, 1956, Ser. No. 605,833

4 Claims. (Cl. 323—89)

The invention relates to saturable amplifier control and sensing combinations, particularly of the type suitable for interconnection in cooperating relation with other electrical devices in order to control the rate of change as well as the variable magnitude of an electrical quantity or other condition.

Thus, many electrical control systems utilize an adjustable master control device as, for example, an adjustable multiposition switch, rheostat, or the like, for varying the magnitude of some quantity or condition such as current, voltage, motor speed, or the like, in accordance with the adjustment of the control device. But in certain cases it may be desirable, or even imperative, that the controlled quantity or condition should not accurately follow any rapid adjustment of the control device but instead should have a substantially constant rate of change to such magnitude as may be determined by the adjustment of the control device.

One of the objects of the present invention is to provide an improved saturable amplifier control and sensing combination capable of providing a substantially linear rate of change of a quantity from one magnitude to another.

A further object is to enable the output of a second-stage amplifier to be changed at a substantially constant rate to an adjustable magnitude that is determined by the adjustable magnitude of input energization of a first-stage saturable amplifier that controls the second.

Briefly, in accordance with the operating principles of the present invention, the improved plural-stage amplifying system has a first-stage saturable amplifier provided with input means for oversaturating the amplifier very substantially beyond the knee of its magnetization curve to initially produce substantially constant output. The second-stage amplifier is provided with capacitor or other rate of change feedback means for limiting the rate of change of output thereof, and input means responsive to the output of the first stage or magnitude control amplifier. Feedback means are also provided for reducing the effective input of the first-stage amplifier as a function of the output of the second-stage amplifier so as to limit the final magnitude of output of both the first and second-stage amplifiers as a function of the oversaturation of the first-stage amplifier.

Although not limited thereto, the present invention may be carried out advantageously with amplifiers of the well-known magnetic type. In this case the adjustable magnitude of energization of the "on" winding of the first-stage magnetic amplifier is always maintained above the value required to saturate the first amplifier. Consequently, a constant output will be initially produced by the first-stage amplifier to energize the "on" winding of the second-stage magnetic amplifier. In order to produce rate of change control, the second-stage magnetic amplifier is provided with an "off" winding having circuit means, which may include a capacitor and preferably, a third-stage magnetic amplifier, for energizing the "off" winding as a function of the rate of change of output of the second-stage amplifier. Such a capacitor feedback circuit will maintain the rate of change of output of the second magnetic amplifier substantially constant or linear, as long as the input of the second-stage amplifier remains at a substantially constant value, due to the saturation of the first-stage magnetic amplifier. But in order to limit the ultimate magnitude of the output of the second amplifier as well as the final output of the first amplifier, an "off" winding of the first-stage amplifier is energized as a function of the output of the second-stage amplifier. In this way the final output of the second-stage amplifier as well as of the first is limited to a value that is dependent upon or determined by the adjustable magnitude of energization of the "on" winding that oversaturates the first amplifier.

The improved operating principle of the plural-stage saturable amplifier rate of change and variable magnitude control combination enables any quantity or condition to be readily varied by suitable electrical or other means controlled in accordance with the rate of change of output of the second-stage amplifier to an adjustable magnitude dependent upon the magnitude of oversaturation of the first-stage amplifier which latter can be readily varied or adjusted by any suitable master control device.

Although not limited thereto, the improved plural-stage magnetic amplifier rate of change control and magnitude determining combination of the present invention is particularly adapted for controlling a widely variable quantity such as the voltage of a polyphase power rectifier of the electronic type, particularly when the power rectifier is embodied in a reversible motor drive system, such as disclosed and claimed in the application S.N. 603,350, of Raymond E. Moore, filed concurrently herewith and assigned to the assignee of the present invention. In such drive system the power rectifier can be reversely connected in accordance with the Moore invention, with the armature of a separately excited direct current motor to regulate the speed thereof during both motoring and regenerative braking operations. But difficulties are likely to be encountered in case of any rapid or excessive change in the inverter or output voltage of the rectifier. However, by controlling the adjustable voltage polyphase power rectifier in accordance with the present invention, a smooth and gradual rate of change variation of its output and inverter voltage, and hence, a substantially constant rate of acceleration or deceleration of the motor to any desired speed can be obtained. Preferably, this is accomplished by means of phase shifting control of the rectifier igniter excitation varying as a function of the rate of change of output of the second magnetic amplifier, while the voltage magnitude is limited by the adjustable magnitude of energization of the "on" winding of the first saturable magnetic amplifier.

The novel features characteristic of the present invention are set forth with particularity in the appended claims. The invention itself, however, together with further objects and advantages thereof may best be understood by referring to the following description taken in conjunction with the accompanying drawings in which—

Figs. 1*a* and 1*b* on separate sheets when placed in adjacent relation constitute a schematic representation of a preferred embodiment of the invention applied for controlling an adjustable voltage power rectifier in a motor speed and regenerative braking control system, such as disclosed and claimed in the Moore application.

Figure 1A:
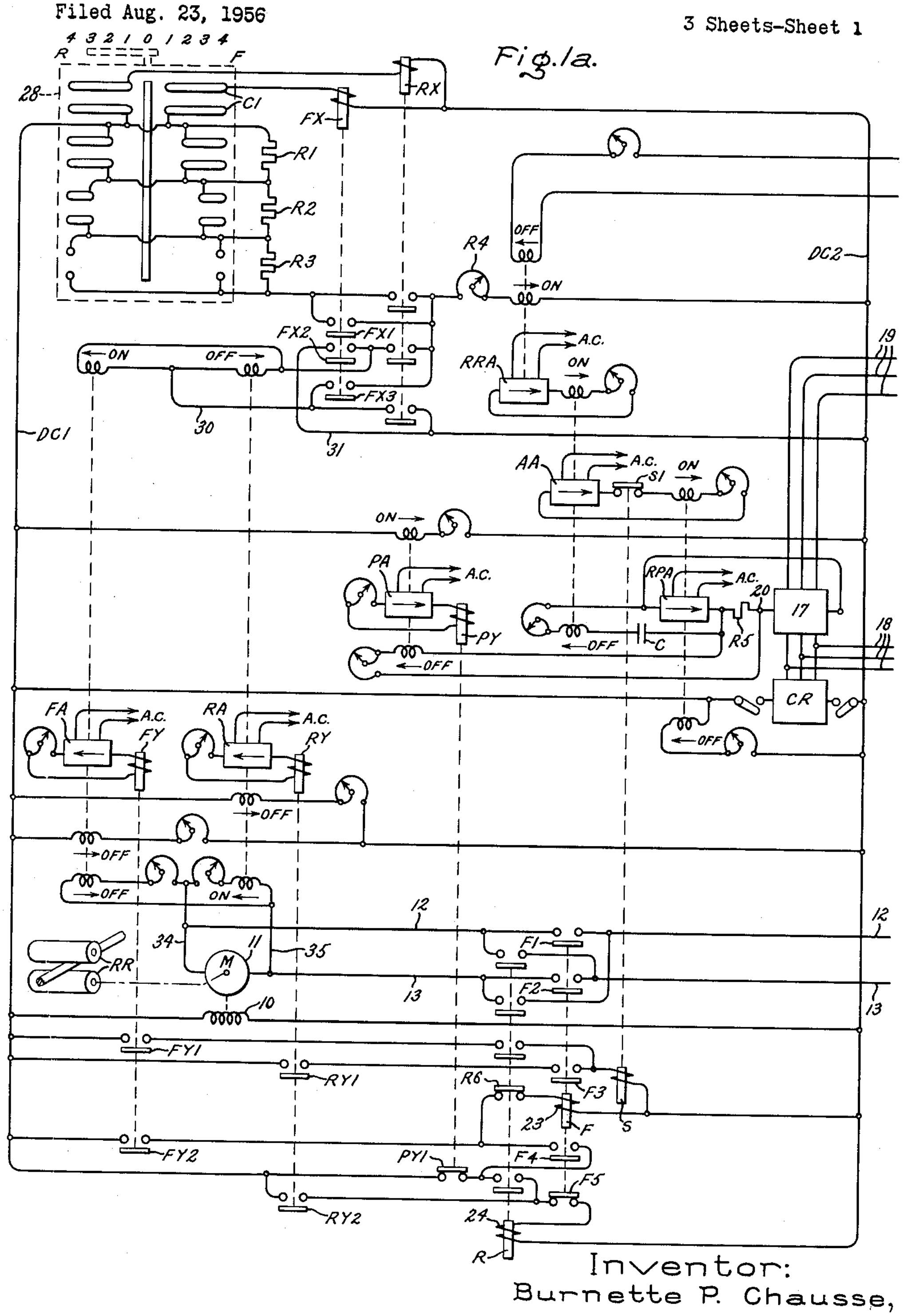
Figures 1B, 2, 3, 4:
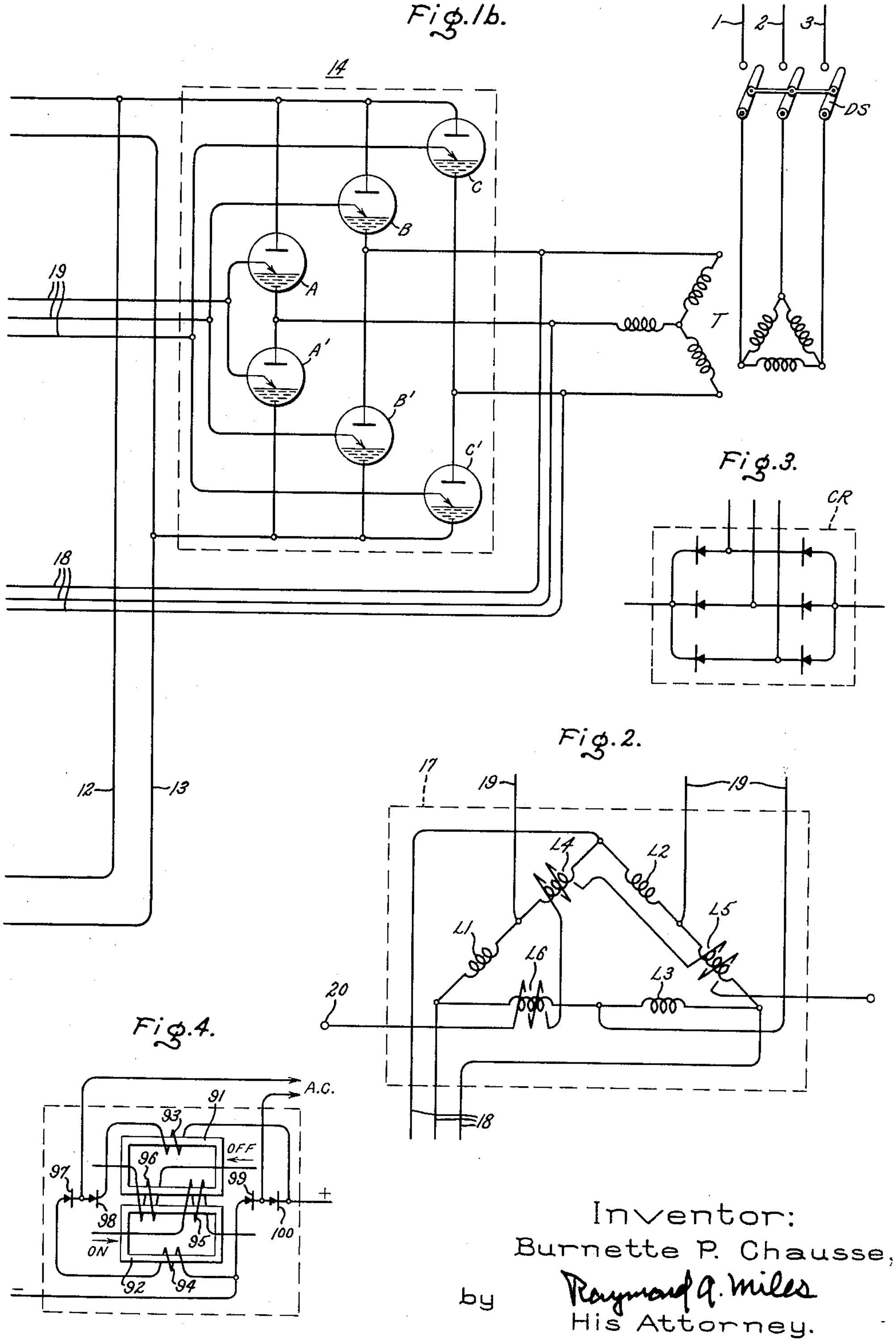
Fig. 2 shows a typical form of phase shifting control suitable for producing inverter action as well as adjusting the voltage of the power rectifier that energizes the armature of the separately excited roll driving motor.
Fig. 3 shows a typical form of three-phase rectifier for supplying the direct current to the separately excited motor field as well as excite various control windings of the magnetic amplifier control and sensing combinations.
Fig. 4 shows a typical form of magnetic amplifier suitable for use in the control system of Figs. 1*a* and 1*b*.

Referring to Figs. 1*a* and 1*b*, I have shown my invention in one form as applied to control the output and inverter voltage of the power rectifier 14 energizing the rolling mill driving motor M that is mechanically connected to drive the reversible rolls RR of the rolling mill. The motor M is provided with a separately excited shunt field winding 10 that is continuously energized from the direct current lines DC1, DC2 which are supplied from the usual three-phase control rectifier CR shown in Fig. 3. The motor armature 11 is connected by means of the electromagnetically operated reversing switches F and R to be energized through the lines 12 and 13 by the adjustable voltage three-phase power rectifier indicated generally by the reference character 14 shown in Fig. 1*b*. Power is supplied to the rectifier 14 from the three-phase A.-C. supply lines 1, 2, 3 through the disconnecting switch DS and the power transformer T which may be of any suitable form.

The power rectifier 14 is shown as of the usual three-phase form having the three ignitrons A, B, C of the mercury arc type for conducting the positive half cycles, and the three ignitrons A′, B′, C′, of the same type, for conducting the negative half cycles. The output voltage of the power rectifier 14 is adjusted by means of a suitable form of phase shift control network indicated as 17 in Fig. 1*a* and shown schematically in Fig. 2. In order to obtain phase shift control, the three-phase A.-C. voltage applied to the power rectifier ignitrons is also applied to the phase shift control network 17 through the lines 18 and is modified by such network 17, so as to produce the desired phase shift in the excitation of the ignitor elements of each of the ignitron tubes A, B, C, and A′, B′, C′ through the lines 19. As is well known in the art, these ignitors are associated with each anode of the ignitrons and require a positive pulse of current once each cycle to start the mercury arc at the beginning of the conducting period. The phase shift network 17 as shown in Fig. 2 consists of fixed reactors L1, L2, L3 and saturable reactors L4, L5, L6 which are used to shift the rectifier firing point on the A.-C. sine wave and thereby control the average magnitude of the D.-C. output voltage. The phase shift is controlled as a function of the magnitude of the current supplied to the saturating winding circuit 20 of the saturable reactors. With zero or minimum current in the saturating winding circuit 20, the phase shift network 17 will produce the maximum inverter voltage at the start of the regenerative braking operation of motor M. As the current in the saturating winding circuit 20 increases, the inverter voltage will decrease to zero. Upon further current increase in circuit 20, the rectifier output voltage will be increased from zero toward the maximum value.

As described in the Moore application, the operating electromagnets of the reversing switches F and R shown in Fig. 1*a* are provided with windings 23 and 24 having alternative energizing circuits controlled respectively by the relays FY and RY. Each of these direction selective relays has a corresponding energizing magnetic amplifier FA and RA, provided with differential control windings, as well as "off" biasing windings for calibrating purposes. These windings, respectively, are indicated as associated with the corresponding magnetic amplifier by the dotted lines in Fig. 1*a*. The upper pair of respective "on-off" control windings are interconnected to be reversely energized under the control of the electromagnetic relays FX and RX in order to selectively effect the initial and alternative energization of the circuits of winding 23 of the forward switch or of the winding 24 of the reverse switch, depending upon whether the master controller indicated generally by the reference character 28 is moved from the "off" position in which it is shown in the forward direction or in the reverse direction.

To carry out the present invention, the multiposition master controller 28 also is provided with suitable contacts for progressively short circuiting the resistors R1, R2, R3 in order to control a variable quantity in accordance with the movement of the controller, i.e., the operating speed of the motor M, depending upon the position 1, 2, 3, 4, to which the controller is operated by varying the reference voltage above the saturation value applied to the "on" winding of the magnetic amplifier RRA that controls the phase shift for the ignitors of the power rectifier 14. At the same time a signal voltage is applied to the upper pair of reversible "on-off" control windings of the magnetic amplifiers FA and RA.

In order to control both the magnitude and the rate of change of the saturating current supplied to the phase shift saturating winding circuit 20, the output of the first magnetic amplifier RRA that is substantially constant due to saturation of this amplifier energizes the "on" winding of the second magnetic amplifier AA, and the output of the second magnetic amplifier in turn energizes the "on" winding of the third magnetic amplifier RPA which finally energizes the phase shift circuit 17. As shown in Fig. 1*a*, the "off" winding of the second magnetic amplifier AA is energized as a function of the rate of change of its own output which is amplified by the third magnetic amplifier RPA and supplied through a circuit including the rate of change control capacitor C in order to produce a substantially constant rate of change of the rectifier voltage when the master controller 28 is operated at any different rate to any speed control position. Since the third magnetic amplifier RPA amplifies the output of the second magnetic amplifier AA, a smaller capacitor C will provide the same rate of change control as would a larger capacitor energized directly in accordance with the output of the second magnetic amplifier AA. The "off" winding of amplifier RRA is energized as a function of the output voltage of rectifier 14 through conductors 20. This corresponds with the energizing voltage of the phase shift circuit 20 supplied by the output of amplifier RPA that, in turn, amplifies the output of amplifier AA.

*Operation*

Assuming the operator calls for forward operation by moving the master controller to any one of the forward positions 1, 2, 3, or 4, the relay FX will be picked up, due to energization from lines DC1, DC2 through contacts C1.

The pickup of relay FX does two things. First, it energizes the upper pair of "on-off" control windings for the magnetic amplifiers FA and RA in the directions indicated by the arrows with a voltage that varies as a function of the movement of the master controller 28 to the selected position. Also it energizes the "on" control winding of amplifier RRA with a related voltage. Thus, assuming the master controller 28 is operated in a forward direction to position 1, the pickup of relay FX will close contacts FX1, FX2 and FX3 substantially simultaneously. The closure of contact FX1 energizes the "on" winding of the magnetic amplifier RRA through a circuit extending from line DC1 through resistors R1, R2, R3 and also the adjustable resistor R4. The simultaneous closure of contact FX3 applies the reference signal voltage as controlled solely by the resistors R1, R2, R3 through the conductor 30 to the upper pair of control windings of magnetic amplifiers FA and RA in parallel, the circuit being completed through contact FX2 and conductor 31 to line DC2. This turns magnetic amplifier FA on to energize relay FY and thereby close contact FY2 to energize the operating winding 23 of the forward switch F. The resulting closure of contacts F1 and F2 connects the armature 11 of motor M to the output conductors 12 and 13 of the rectifier 14 to produce operation of the motor M in the forward direction.

The energization of the "on" windings of magnetic amplifiers RRA, AA, and RPA serves to supply a varying phase shift control voltage to the saturating winding circuit 20 of the phase shift network 17. This control voltage will increase to a magnitude determined by the resistors R1, R2, R3 in the energizing circuit of the "on" winding of magnetic amplifier RRA but at a rate determined by the charging current of the capacitor C in the feedback circuit energizing the "off" winding of the magnetic amplifier AA. A corresponding increase in voltage output of the rectifier 14 will thus be applied to motor armature 11 to accelerate the motor to the desired speed determined by the control exerted by the reference voltage control resistors R1, R2, R3. In case the master controller 28 is then advanced progressively to any of the positions 2, 3 and 4, the motor will be accelerated in a similar manner to each corresponding higher speed by the successive short circuiting of the resistors R1, R2, R3, thereby producing a corresponding increase in the voltage applied to the saturating winding circuit 20 of the phase shift network 17 with a corresponding increase in the output voltage of the rectifier 14. In case the master controller is initially operated in the reverse direction, substantially the same procedure will occur except that relay RX is picked up and amplifier RA is turned on to pick up relay RY and thereby close the reverse switch R.

In order to maintain the armature 11 or motor M energized from the rectifier 14 in either direction independently of the direction selective magnetic amplifiers FA and RA, the relay PY is provided. The energizing magnetic amplifier PA for energizing relay PY is normally biased "on" by its "on" biasing winding which is interconnected between the lines DC1, DC2. As a result relay PY is normally picked up. But when the output of magnetic amplifier RPA produces a current flow through the resistor R5, the "off" winding of magnetic amplifier PA becomes energized to turn the amplifier PA off and thereby drop out relay PY. The resulting closure of contact PY1 (assuming forward operation) serves to maintain the energization of the circuit of operating winding 23 through contacts F4 and R6 independently of the relay contact FY2 and, therefore, independently of the direction selective magnetic amplifier FA. As will be seen, this enables the reversing switches F and R to be operated to effect regenerative braking of the motor M in the following manner:

*Regenerative braking*

In case the master switch 28 (assuming forward operation) is moved in a direction to reduce the speed of motor M, as for example, from any higher numbered position to a lower numbered position, the magnitude of the reference voltage signal applied to the "on" winding of magnetic amplifier FA and the "off" winding of magnetic amplifier RA will be correspondingly decreased. The differential pair of "on-off" windings for these magnetic amplifiers FA and RA are connected to be responsive to the voltage across the motor armature 11 by the conductors 34 and 35. As a result the "off" differential winding of magnetic amplifier FA can predominate sufficiently to turn the amplifier FA off and thereby deenergize the relay FY. At the same time the "on" winding of amplifier RA can predominate over the reduced energization of the "off" control winding so as to turn on amplifier RA and thereby pick up relay RY. This will close contacts RY1 and RY2. The closure of contact RY1 while reversing switch F is maintained energized by contact PY1 will energize relay S through contact F3. The resulting pickup of contact S1 will open the "on" control winding energizing circuit of amplifier RPA, thereby reducing the output thereof to a minimum. This does two things. First, it reduces the energization of the saturating winding circuit 20 of the phase shift network 17 to a minimum. As a result the rectifier 14 will produce the maximum inverter voltage, as previously pointed out.

The second thing is the resulting decrease in the energization of the "off" winding of amplifier PA sufficiently to enable the "on" winding to turn this amplifier on and pick up relay PY, thereby opening contact PY1 and deenergizing the operating winding 23 of the forward switch F. As soon as the normally closed contact F5 closes, the energizing circuit for the operating winding 24 of the reversing switch R is completed, since relay RY is picked up and contact RY2 is closed. The resulting pickup of switch R will reverse the connection of the motor armature 11 with the output connections 12 and 13 of rectifier 14.

The dropping out of switch F will open the energizing circuit of relay S, thereby reclosing contact S1 to again energize the "on" winding of the magnetic amplifier RPA. As a result the voltage applied to the saturating winding circuit 20 of the phase shift network 17 will be increased at a rate determined by the feedback capacitor C, thereby progressively reducing the inverter voltage of rectifier 14 until it is less than the counterelectromotive force of the motor armature 11. Under these conditions regenerative braking of the motor M will occur with the regenerative braking current fed back through the rectifier 14 due to inverter action thereof to the A.-C. supply lines until the motor speed has been reduced to the value at which the counterelectromotive force energization of the differential "on-off" windings of amplifiers FA and RA no longer predominates over the upper pair of "on-off" control windings that are energized in accordance with the adjustable reference voltage. Under such conditions the amplifier RA will be turned off and the amplifier FA will be turned on. The relay RY responds to the turning off of amplifier RA to open contact RY2, thereby deenergizing the operating electromagnet of switch R. As soon as contact R6 is closed, the operating electromagnet 23 of the forward switch F will be energized, since contact FY2 is closed.

In case the master switch 28 should be moved from any forward position to any reverse position, regenerative braking of the motor M is obtained in exactly the same way as just described. But in this case the regenerative braking will continue until the motor speed is reduced to zero, and the reverse switch R will be maintained energized so as to accelerate the motor M in the reverse direction as the energization of the saturating winding circuit 20 of the phase shift network 17 is progressively increased to change from inverter action to rectifying action, the rate of change being regulated by the feedback circuit through capacitor C and the "off" winding of amplifier AA in the manner previously described.

Each of the magnetic amplifiers referred to above may be of the well-known bridge type schematically shown in Fig. 4. Briefly, this type of magnetic amplifier comprises two separate magnetic cores 91 and 92 having the reactor windings 93 and 94 as well as the control winding 95, and reference or biasing winding 96 interlinked therewith as shown. The reactor windings 93, 94 are interconnected with the rectifiers 97, 98, 99, 100, as shown, to form a bridge circuit that is continuously energized from a suitable alternating current source connected between the rectifiers. A load circuit is interconnected with the bridge, as shown, to supply energization to the electromagnetic relays that are energized under control of the magnetic amplifier with direct current of a polarity as indicated.

Figure 5:
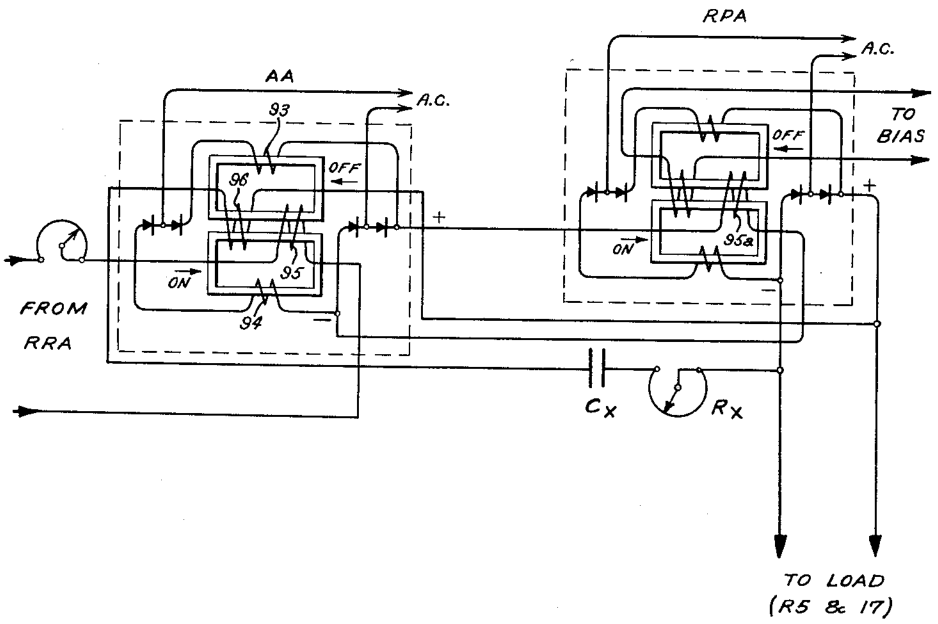
Fig. 5 is a modification of the schematic diagram of Fig. 4 illustrating a two-stage saturable core magnetic amplifier which might be embodied in the invention.

The biasing winding 96 serves to establish a reference magnetization of the cores 91, 92 opposite to the magnetizations produced by the reactor windings 93 and 94, and also in opposition to the magnetization produced by the control winding 95. Consequently, the magnitude of the signal energizing the control winding 95 required to trigger the amplifier to produce load current can be varied by adjustment of the energization of the biasing winding 96 in the manner previously explained. The feedback connection is illustrated in detail by Fig. 5 wherein opposing voltage is fed by a capacitor $C_x$ and a variable resistor $R_x$ from the output of amplifier RPA to a control winding of amplifier AA.

While I have shown and described a preferred form of my invention by way of illustration, many modifications will occur to those skilled in the art. I, therefore, contemplate by the appended claims to cover all such modifications as fall within the true spirit and scope of my invention.

What I claim as new and desire to secure by Letters Patent of the United States is:

1. In an amplifying system, a first stage saturable core magnetic amplifier having an output circuit and a saturation control winding, adjustable excitation supply means connected to said winding for initially oversaturating said amplifier substantially beyond the knee of its magnetization curve to produce substantially constant output thereof, a second stage saturable core magnetic amplifier provided with an input control winding having electrical connections to the output of said first stage amplifier and an output circuit, means for limiting the rate of change of output of said second stage amplifier to a predetermined value comprising an electrical rate of change responsive device connected to the output of said second stage amplifier for producing an electrical quantity related to the rate of change of output and means for reducing the magnetization of the core of said first stage amplifier comprising a winding connected to the output of said second stage amplifier and poled to oppose the magnetization produced by said saturation control winding.

2. In an amplifying control system a first stage saturable core magnetic amplifier having an output circuit and a saturation control winding, adjustable supply means having electrical connections to said control winding for initially oversaturating said amplifier to predetermined values substantially beyond the knee of its magnetization curve to effect substantially constant output thereof, a second stage magnetic amplifier having an output circuit, an input saturation control winding having electrical connections to the output of said first stage amplifier and feedback circuit means having electrical connections to the output of said second stage amplifier including an electrical energy storage device, and means comprising a control winding on said first stage amplifier poled to oppose its said saturation control winding and having electrical connections to the output of said second stage amplifier to reduce the saturation of said first stage magnetic amplifier and thereby reduce its output to a final value related to the initial oversaturation thereof.

3. In combination, a first stage saturable core magnetic amplifier having an output circuit, an "on" saturation control winding and an oppositely poled "off" winding, adjustable voltage supply means having electrical connection to said "on" winding for adjusting the excitation of said "on" winding to initially oversaturate said amplifier substantially beyond the knee of its magnetization curve by a preselected amount to produce an initial output having a value which remains constant throughout a wide range of values of oversaturation, a second stage magnetic amplifier provided with an output circuit and an "on" winding having electrical connections to the output of said first stage amplifier, means having electrical connections to the output of said second stage amplifier for energizing said oppositely poled "off" winding to reduce the initial oversaturation of said first stage magnetic amplifier to produce an output of said first stage magnetic amplifier related to said preselected initial amount of oversaturation, and means for limiting the rate of change of output of said second stage amplifier to a predetermined value comprising a feedback circuit having connections to the output of said second stage amplifier and including a device connected to be responsive to the output of said second stage amplifier for producing an electrical quantity having a value related to the rate of change of output of said second stage amplifier.

4. In combination a first stage saturable core magnetic amplifier having "on" and "off" saturation control windings, means for adjustably energizing said "on" winding to initially oversaturate said amplifier in the flat region beyond the knee of its magnetization curve by a preselected amount to produce an initial output having a value which remains substantially constant for all values of oversaturation, a second stage magnetic amplifier provided with an "on" saturation control winding having electrical connections to the output of said first stage amplifier, means connected to be supplied from the output of said second stage amplifier for producing a voltage varying in magnitude with the output voltage thereof and electrical connections from said voltage producing means to said "off" winding of said first stage amplifier for supplying said varying voltage to said first stage "off" winding thereby to limit the final magnitude of said variable voltage to a value related to the magnitude of initial oversaturation of said first stage amplifier.

References Cited in the file of this patent

UNITED STATES PATENTS

| | | |
|---|---|---|
| 2,635,223 | Grillo | Apr. 14, 1953 |
| 2,709,779 | Bixby | May 31, 1955 |
| 2,717,355 | Louden | Sept. 6, 1955 |
| 2,730,574 | Belsey | Jan. 10, 1956 |
| 2,764,719 | Woodson | Sept. 25, 1956 |
| 2,775,724 | Clark | Dec. 25, 1956 |